June 1, 1926.
H. L. FERRIS
SOIL PULVERIZER
Filed June 6, 1925
1,587,223
2 Sheets-Sheet 2
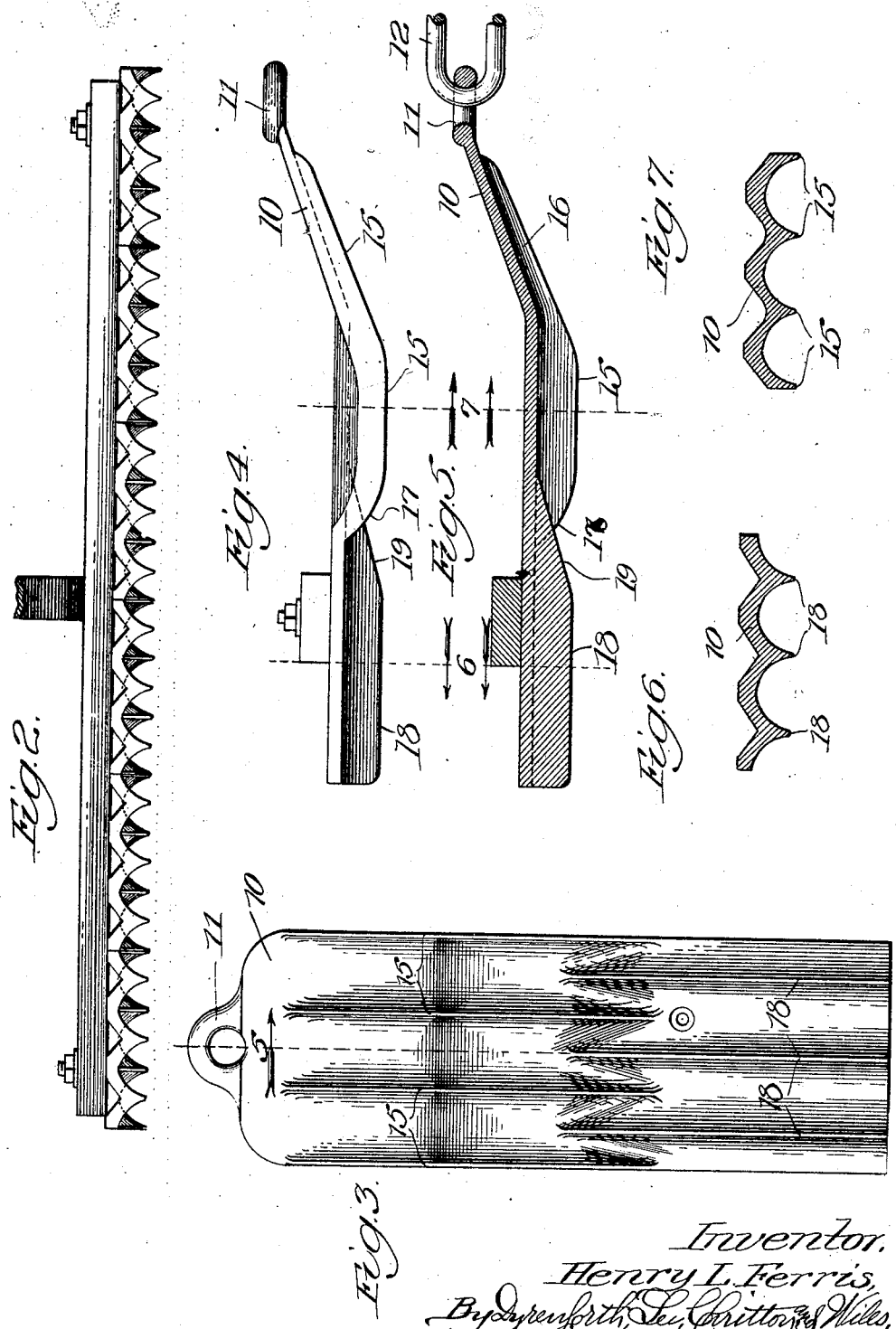

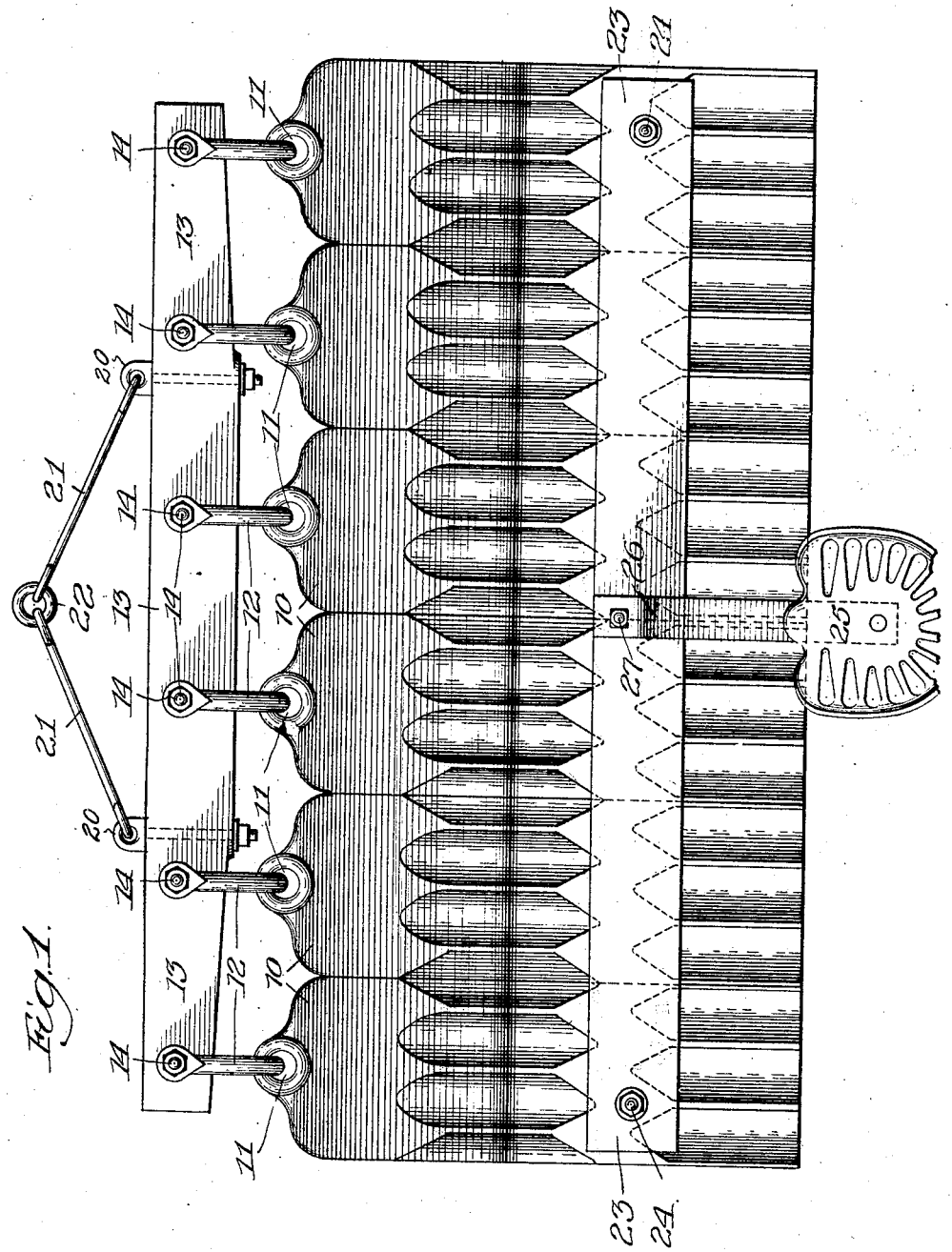

Patented June 1, 1926.

1,587,223

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

SOIL PULVERIZER.

Application filed June 6, 1925. Serial No. 35,428.

This invention relates to soil pulverizers and the like and are particularly adapted to be used in the final stage of the preparation of soil for planting.

An object of the invention is to provide a simple means for crushing and pulverizing clods, and for mulching the upper surface of the soil after plowing and harrowing.

Another object is to provide such a means which is simple and efficient to manufacture and which at the same time is rugged and which needs almost no attention to maintain it in good working order.

Another object is to provide a device of this character which is readily assembled and disassembled and which easily lends itself to various sized implements by the simple process of adding or subtracting units.

Another object is to provide a soil pulverizer which can readily be disassembled into convenient units for handling and for transportation from one field to another and reassembled for use.

These and other objects are accomplished by this invention which is fully described in the following specification and shown in the accompanying drawings, in which, Figure 1 is a top plan view of the implement;

Fig. 2 is a rear elevation of the same;

Fig. 3 is a bottom plan view of one of the units;

Fig. 4 is a side elevation of the same;

Fig. 5 is a vertical longitudinal section on the line 5 of Fig. 3; and

Figs. 6 and 7 are transverse sections on the lines 6 and 7 of Fig. 5.

The invention as illustrated comprises a series of units 10 each of which has an opening 11 formed in its forward end which is adapted to receive a clevis 12 by which it may be secured to a cross-bar 13 by means of pins or bolts 14 passing through the open end of the clevis and through the cross-bar.

The units 10 are preferably castings and have a series of longitudinal ribs 15 on their under surface at the forward end as shown in Fig. 7. These ribs are preferably of a transversely concavely arcuate cross-section, the forward end of the unit 10 and the ribs 15 being turned upwardly at the forward ends as shown in Figs. 4 and 5 so as to cause the device to ride up over and crush clods over which the pulverizer is dragged. It will be observed that the extensions 16 of the ribs 15 are made increasingly shallow toward the forward end of the unit.

The rear end 17 of the ribs 15 are curved upwardly toward the body of the unit and a rear set of ribs 18 are set parallel to the ribs 15 and staggered therewith so as to split the spaces between the forward ribs as is shown in Fig. 2.

Thus it will be seen that as the device is dragged over the soil which has previously been plowed and harrowed or the like, the forward ribs 15 will cut into the soil forming a series of parallel grooves therein corresponding to the ribs 15.

To prevent any tendency of clods which collect between the ribs 15 shifting over in an unbroken and uncrushed state, into the spaces between the rear ribs 18, the forward shallow inclined ends of the ribs 18 are carried somewhat beyond the rear ends 17 and into the spaces between the front ribs 15 as is clearly shown in Fig. 5. Thus clods are settled in the soil by the forward ribs 15 and are split, crushed and pulverized by the rear ribs 18.

At the same time the weight of the various units combined with the form of the ribs compresses the soil so as to close up many of the air spaces which result from plowing. Moreover the grinding and crushing action has pulverized the upper layer thereby forming a dust mulch which materially assists in retaining the moisture within the soil at the same time packing it somewhat so as to prevent its being blown away by the wind.

In the device shown in Fig. 1, the crossbar 13 is provided with eye bolts 20 to which are secured links 21 and a ring 22 by means of which the pulverizer may be attached to any suitable draft means such as a tractor, a team of horses, or it may be drawn behind a harrow, grain drill or other farming implement.

A seat bar 23 is placed across the top of the horizontal portions of the various units and is secured to two or more of the units by means of bolts 24 passing therethrough. A seat 25 is carried on the seat bar 23 by means of a leaf spring 26 which is secured to the seat bar by means of the bolt 27.

As this pulverizer is dragged over the plowed and harrowed soil, each individual unit being relatively narrow and spaced somewhat from the adjacent units, is free to move independently of the others so that they sink into all of the unevennesses of the ground thereby insuring a uniform pulverizing effect in a degree unknown to previously used devices. If, however, there is any unusual hump in the soil the intermediate and unbolted units are prevented from rising because of the seat bar 23 and the tendency is therefore to crush such a hump with somewhat more force than that applied to the soil on both sides of it.

It is a prime importance that the elements 10 may be made entirely in the foundry, thereby enabling them to be cast from iron which is often objectionable because of the difficulty in working it.

It will readily be understood that these units adapt themselves to carry additional weights where it is desired that such should be added to increase the pulverizing effect.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A cast integral soil pulverizing and packing element adapted to be dragged comprising a body which is adapted to lie on the soil, one end being inclined and provided with draft attaching means, the under surface having a plurality of parallel longitudinal ribs of concavely arcuate cross-section having thin edges which cut into the soil and cause it to pack in ridges.

2. A soil pulverizing and packing element adapted to be dragged comprising a body which is adapted to lie on the soil, one end being inclined and provided with draft attaching means, the under surface having a plurality of concavely arcuate longitudinal ribs having thin edges which cut into the soil and cause it to pack in ridges, said ribs terminating intermediate the ends of said body, and a second set of ribs beginning near the rear ends of the forward set of said ribs and staggered therewith so that the rear ribs split the ridges made by the forward ribs, all said ribs having straight edge portions lying in substantially the same horizontal plane.

3. A soil pulverizing and packing element adapted to be dragged comprising a body which is adapted to lie on the soil, one end being inclined and provided with draft attaching means, the under surface having a plurality of concavely arcuate longitudinal ribs having thin edges which cut into the soil and cause it to pack in ridges, said ribs terminating intermediate the ends of said body, and a second set of ribs beginning in advance of the rear ends of the forward set of said ribs and staggered therewith so that the rear ribs split the ridges made by the forward ribs, all said ribs having straight edge portions lying in substantially the same horizontal plane.

4. A soil pulverizing and packing element adapted to be dragged comprising a body which is adapted to lie on the soil, one end being inclined and provided with draft attaching means, the under surface having a plurality of concavely arcuate longitudinal ribs having thin edges which cut into the soil and cause it to pack in ridges, said ribs terminating intermediate the ends of said body, and a second set of ribs beginning in advance of the rear ends of the forward set of said ribs and staggered therewith so that the rear ribs split the ridges made by the forward ribs, the forward ends of the rear ribs being tapered so as to begin splitting the clods while they are held between the forward ribs.

5. A soil pulverizing and packing element adapted to be dragged comprising a body which is adapted to lie on the soil, one end being inclined and provided with draft attaching means, the under surface having a plurality of parallel longitudinal ribs having thin edges which cut into the soil and cause it to pack in ridges, said ribs terminating intermediate the ends of said body, and a second set of ribs beginning near the rear ends of the forward set of said ribs and staggered therewith so that the rear ribs split the ridges made by the forward ribs, one of said ribs being divided near its greatest depth by the side of said element so that two adjacent elements form the complete rib.

HENRY L. FERRIS.